(12) United States Patent
Wang et al.

(10) Patent No.: US 12,397,441 B2
(45) Date of Patent: Aug. 26, 2025

(54) UNDERWATER CLEANING ROBOT

(71) Applicants: Hua Wang, Zhejiang (CN); Zhongchu Feng, Zhejiang (CN); Liye Zhou, Zhejiang (CN)

(72) Inventors: Hua Wang, Zhejiang (CN); Zhongchu Feng, Zhejiang (CN); Liye Zhou, Zhejiang (CN)

(73) Assignee: Taizhou Surface Technology Co., Ltd., Taizhou (CN)

( * ) Notice: Subject to any disclaimer, the term of this patent is extended or adjusted under 35 U.S.C. 154(b) by 415 days.

(21) Appl. No.: 18/065,639

(22) Filed: Dec. 14, 2022

(65) Prior Publication Data

US 2023/0110455 A1    Apr. 13, 2023

(51) Int. Cl.

| | |
|---|---|
| *E04H 4/16* | (2006.01) |
| *B25J 5/00* | (2006.01) |
| *B25J 11/00* | (2006.01) |
| *B25J 13/08* | (2006.01) |
| *B25J 19/00* | (2006.01) |
| *B25J 19/02* | (2006.01) |

(52) U.S. Cl.
CPC ........... *B25J 11/0085* (2013.01); *B25J 5/007* (2013.01); *B25J 13/081* (2013.01); *B25J 13/085* (2013.01); *B25J 19/0075* (2013.01); *B25J 19/02* (2013.01); *E04H 4/1636* (2013.01); *E04H 4/1654* (2013.01)

(58) Field of Classification Search
CPC ....... E04H 4/16; E04H 4/1636; E04H 4/1654; B25J 11/0085
See application file for complete search history.

(56) References Cited

U.S. PATENT DOCUMENTS

2023/0313548 A1* 10/2023 Wang ..................... E04H 4/16 15/1.7
2023/0349186 A1* 11/2023 Changda

* cited by examiner

*Primary Examiner* — Michael D Jennings

(57) ABSTRACT

A cleaning robot for underwater includes a main body including a magnetic speed detection mechanism and a magnetic collision buffer mechanism. The magnetic speed detection mechanism includes two speed detection wheel mechanisms mounted on the main body. The speed detection wheel mechanism includes a wheel bracket, an induction wheel rotationally disposed inside the wheel bracket, a magnet embedded on one side of the induction wheel, and a magnetic force sensor disposed inside the wheel bracket and located on one side of the magnet.

10 Claims, 8 Drawing Sheets

UNDERWATER CLEANING ROBOT

FIELD OF THE INVENTION

The invention relates to robots and more particularly to an underwater cleaning robot having improved characteristics.

BACKGROUND OF THE INVENTION

While public swimming pools and private swimming pools are increased, an underwater cleaning robot emerges. The underwater cleaning robot, used to automatically clean the bottoms of these swimming pools, includes a cleaning and filtering part, a running and driving part, and a power supply part. The running and driving part includes wheel driving, crawler driving, and water spray driving.

Compared with a wheel-driven underwater cleaning robot, the water spray driven underwater cleaning robot cannot detect a moving speed of the cleaning robot and cannot adjust water spray power according to the moving speed, but only outputs the full power according to the battery power. This greatly shortens the effective cleaning time.

In addition, the same as an conventional sweeping robot, an collision sensing mechanism needs to be mounted on the underwater cleaning robot. However, the collision sensing mechanism of the existing underwater cleaning robot uses a contact type metal spring and shrapnel as a buffer mechanism, to realize displacement, restoration, and signal triggering of the mechanism after the underwater cleaning robot hits a wall. However, metals of the underwater cleaning robot, such as the metal spring or the shrapnel may be corroded in water, especially in water of swimming pools containing high content of chloride ions. This not only pollutes the main body of the robot, but also greatly reduces the buffering performance, and cannot meet the needs of users.

Thus, the need for improvement still exists.

SUMMARY OF THE INVENTION

The invention provides an underwater cleaning robot, to resolve the technical problems in background.

To achieve the objectives above, the invention provides the following technical solution: a magnetic speed detection mechanism of the underwater cleaning robot includes a speed detection wheel mechanism mounted on a main body of the cleaning robot. The speed detection wheel mechanism includes a wheel bracket, an induction wheel rotationally disposed inside the wheel bracket, a magnet embedded on one side of the induction wheel, and a magnetic force sensor disposed inside the wheel bracket and located on one side of the magnet.

Preferably, an axle that is inserted through the induction wheel and passes the inner part of the wheel bracket.

Preferably, the top of the wheel bracket is provided with a through-hole for mounting the magnetic force sensor, and a positioning rod is disposed on one side of the through-hole.

Preferably, at least one concave platform is disposed on the main body of the cleaning robot, and the wheel bracket is mounted inside the concave platform.

Preferably, the top of the concave platform is provided with a connection column, and one end of the positioning rod extends inside the connection column and is provided with a tight-fit sleeve.

Preferably, at least one stop block whose one end reaches the top of the concave platform is disposed on the top of the wheel bracket.

Preferably, the magnetic collision buffer mechanism of the underwater cleaning robot includes collision mechanisms mounted on the main body of the cleaning robot. The collision mechanism includes a collision plate, a lower collision lip plate disposed at the bottom of the collision plate, a fixing block disposed on the lower collision lip plate, and a first magnetic member embedded at one side of the fixing block. Buffer grooves in which a second magnetic member is embedded are disposed on the main body of the cleaning robot and used for mounting the collision plate and the lower collision lip plate. Like poles of the first magnetic members and the second magnetic members are opposite each other.

Preferably, quantities of the buffer grooves and the collision mechanisms are at least two, and the two collision mechanisms respectively correspond to forward and backward directions of the main body of the robot.

Preferably, a limit switch is disposed inside the buffer groove, and one end of a shift lever of the limit switch is attached to an inner wall of the collision plate, to trigger the limit switch when the collision mechanism is displaced.

Preferably, a clamping groove is disposed at an opening of the buffer groove, one side of the collision plate is bent and buckled inside the clamping groove, and at least one protrusion of which one end abuts against the collision plate is disposed inside the clamping groove.

Preferably, pulleys are disposed in the buffer groove and the tops of the pulleys extend to the inner part of the fixing block. Quantities of the fixing blocks and the pulleys located in the same buffer groove are not less than two.

Compared with the conventional art, the underwater cleaning robot provided in the invention has the following beneficial effects:

Due to the speed detection wheel mechanism, when the induction wheel rotates, the induction wheel can drive the magnet to pass the magnetic force sensor. After the magnetic force sensor calculates the rotating speed of the induction wheel, the main body of the cleaning robot can automatically increase or decrease the water spray driving force according to a moving speed of the induction wheel, to maintain a certain moving speed of the main body of the cleaning robot, improve adaptability to the terrain at the bottom of a swimming pool, and control running power, so that the battery energy can be effectively saved, the battery life can be prolonged, effective cleaning time can be increased, and the needs of users can be met. Due to the collision mechanism, the second magnetic member and the first magnetic member can be respectively embedded in the positions corresponding to the main body of the cleaning robot and the collision mechanism, to realize non-contact magnetic buffering. In comparison with the metal springs and the shrapnels, the service life is effectively prolonged, and the metal corrosion and pollution can be prevented, so that the underwater cleaning robot is more environment-friendly, gets more economic benefit, and has broad application prospects.

The above and other objects, features and advantages of the invention will become apparent from the following detailed description taken with the accompanying drawings

DETAILED DESCRIPTION OF THE INVENTION

Figure 1:
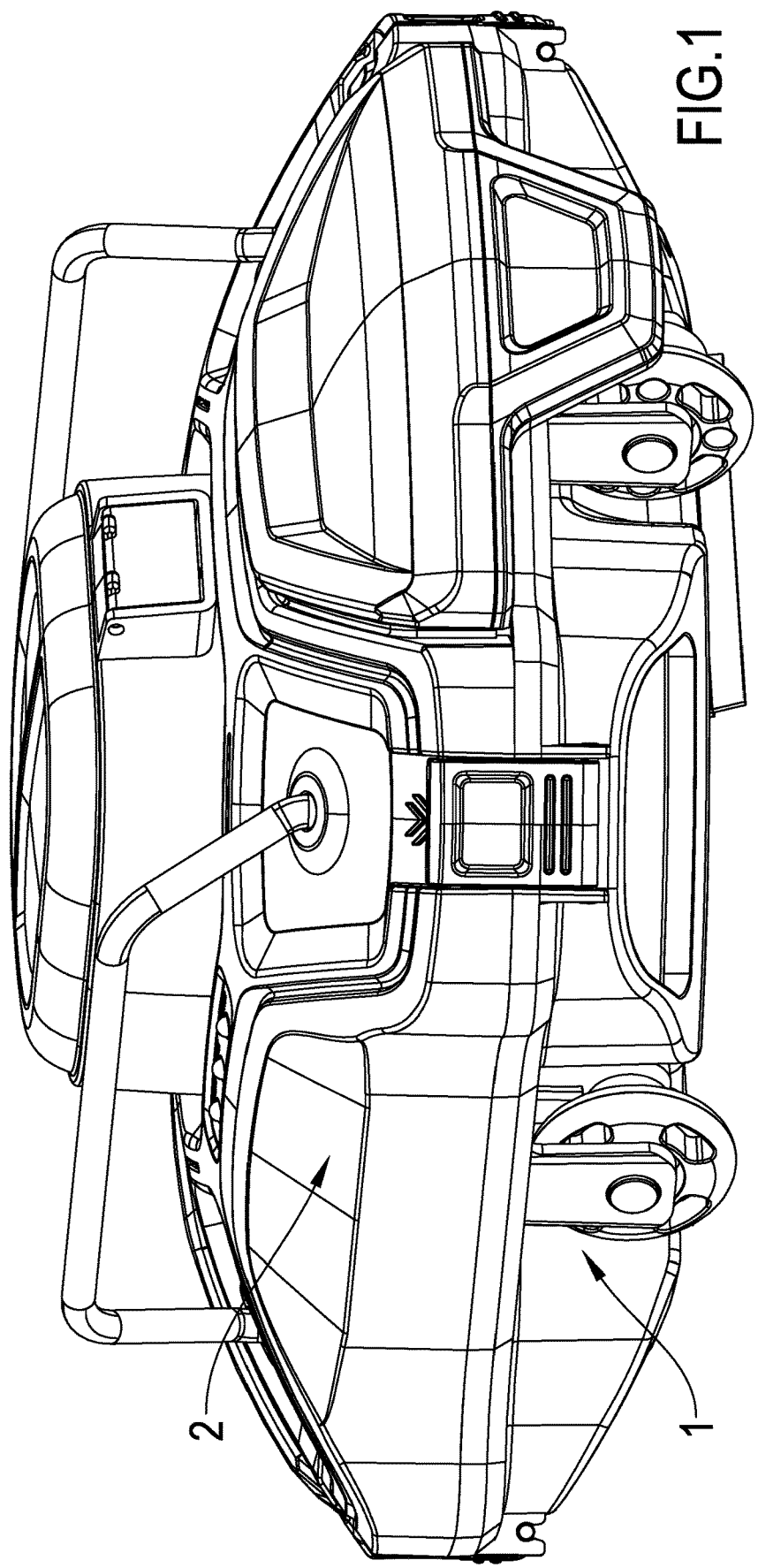
FIG. 1 is a perspective view of an underwater cleaning robot according to the invention.
Figure 2:
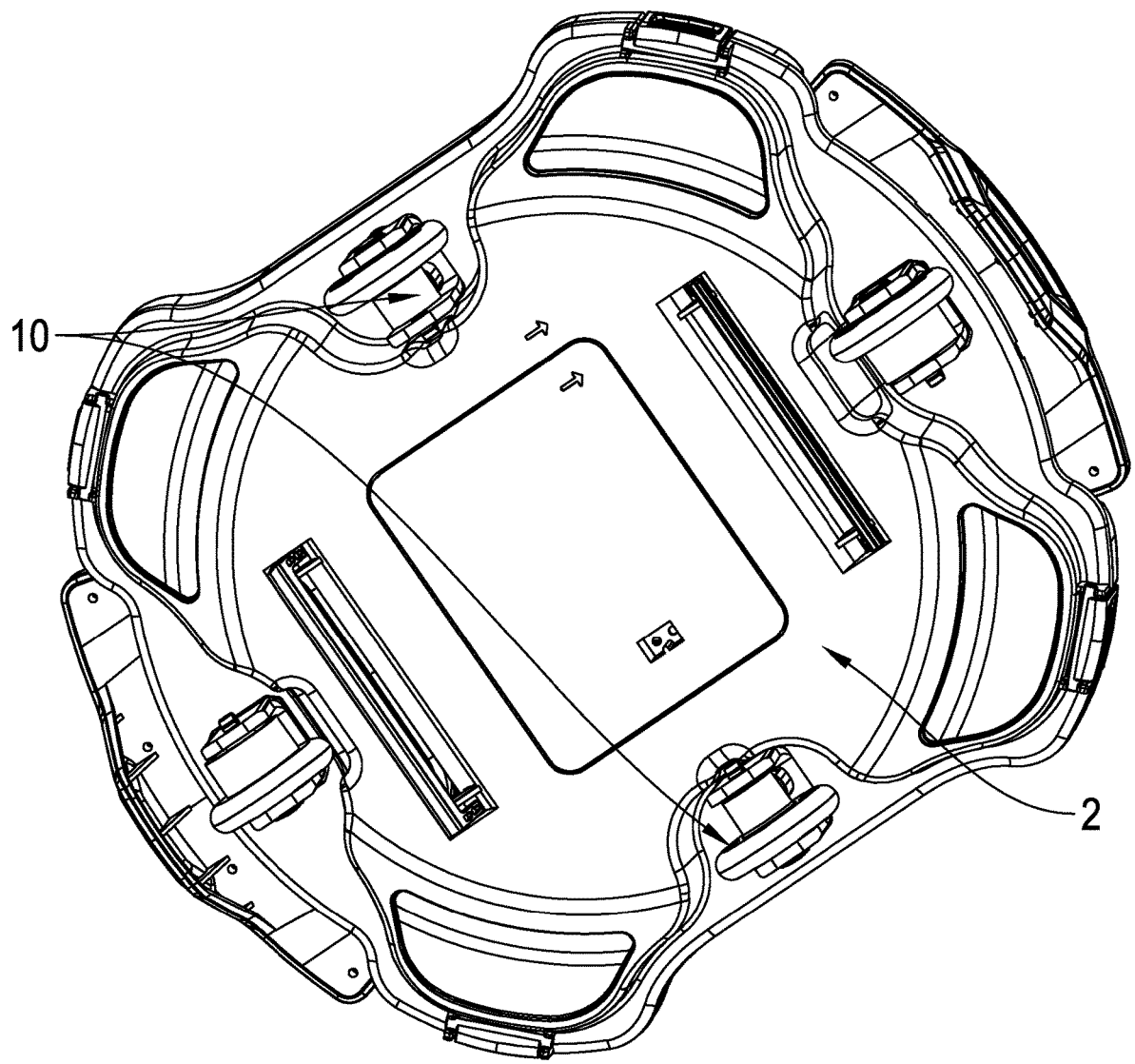
FIG. 2 is a bottom view of the underwater cleaning robot.
Figure 3:
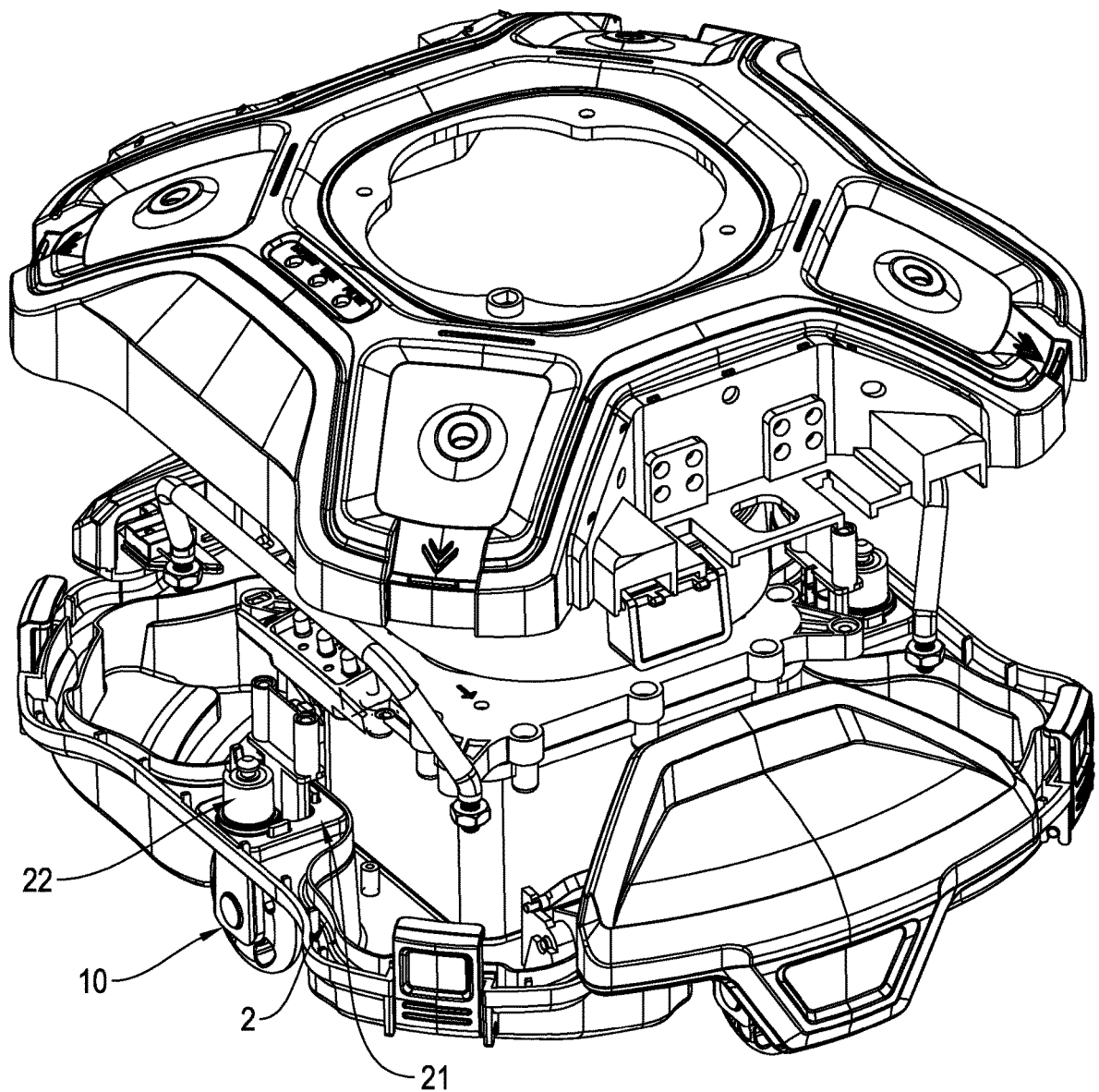
FIG. 3 is a partial exploded view of the underwater cleaning robot.
Figure 4:
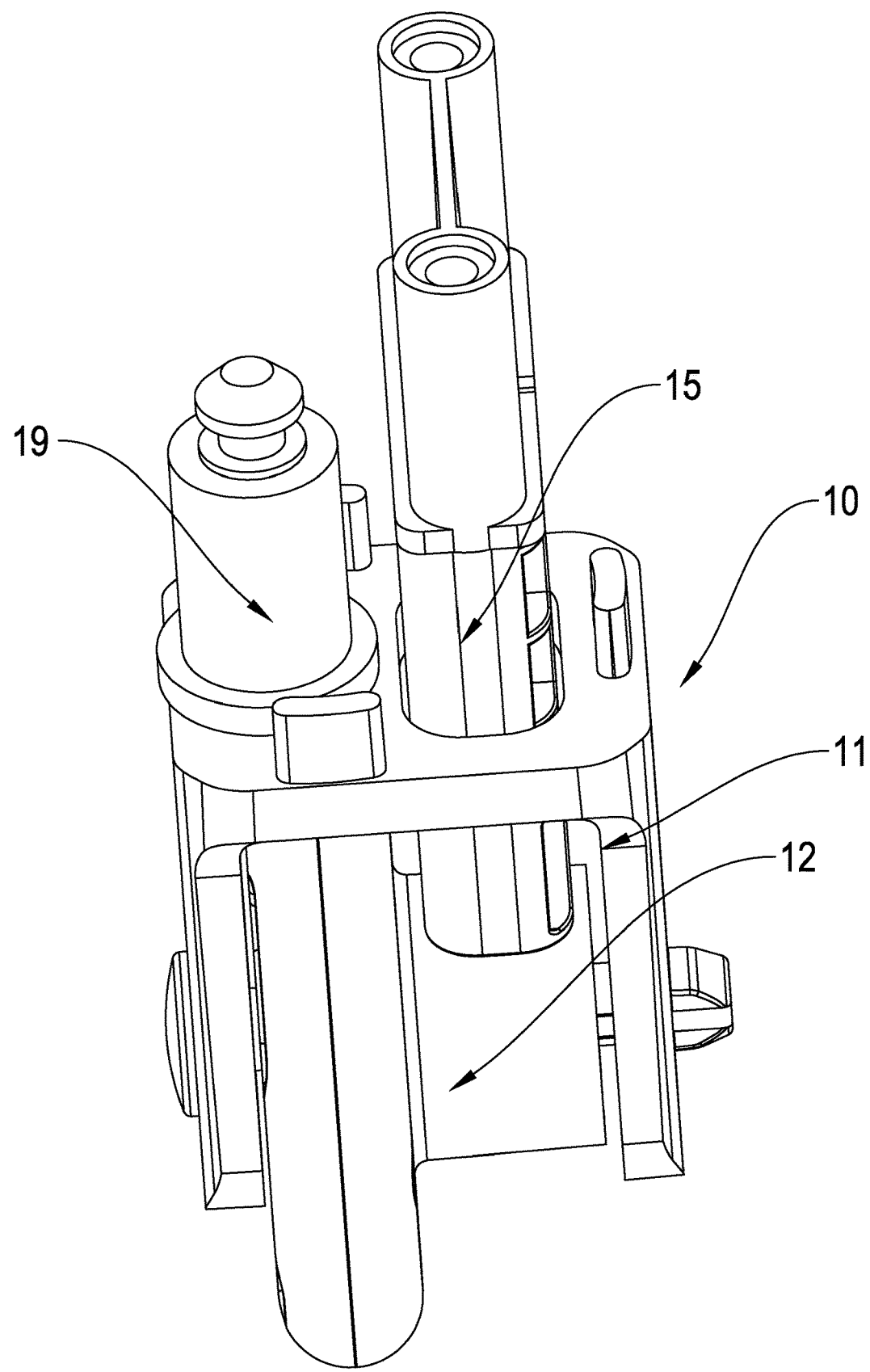
FIG. 4 is a perspective view of a speed detection wheel mechanism of the underwater cleaning robot.
Figure 5:
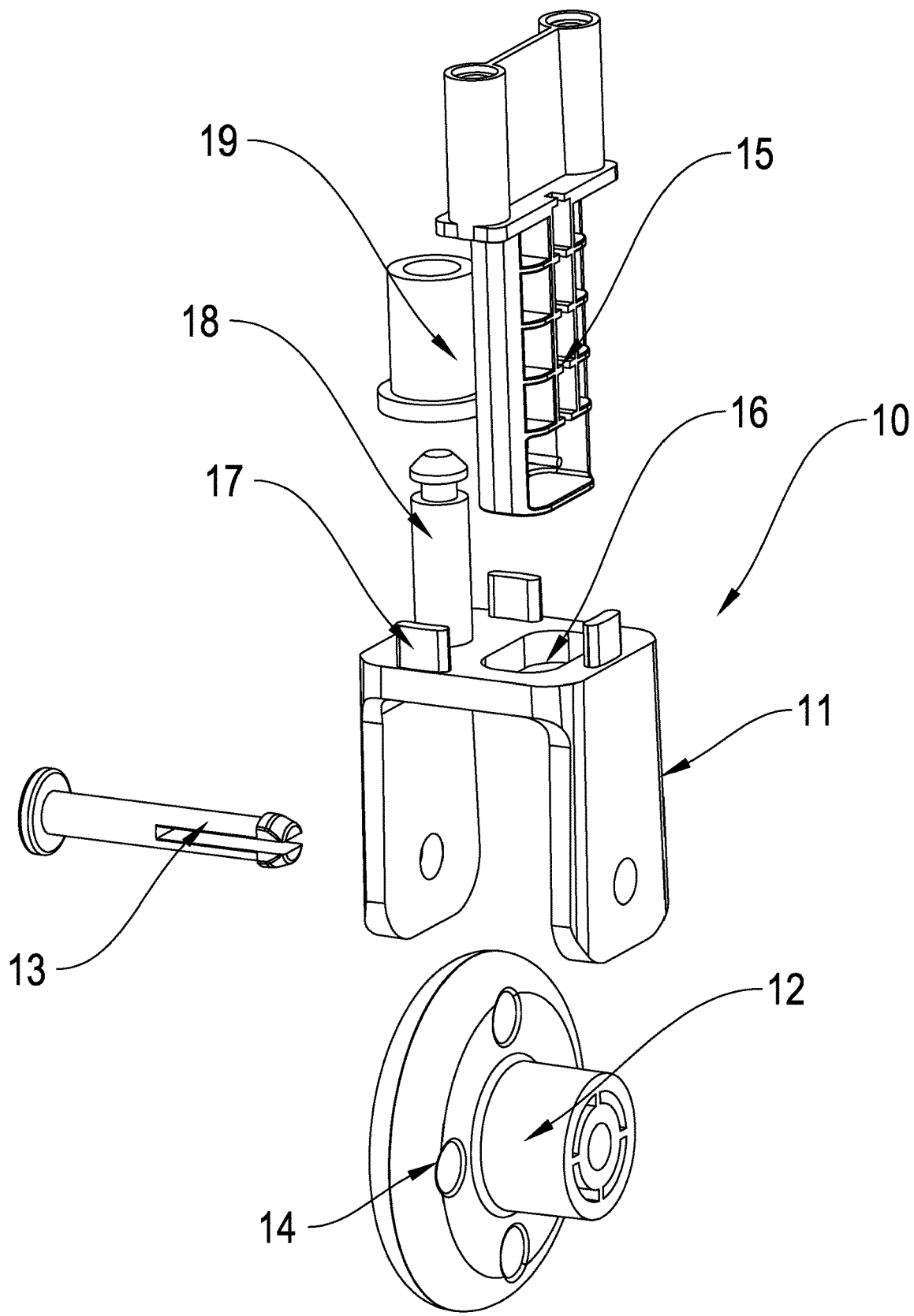
FIG. 5 is an exploded view of the speed detection wheel mechanism.

The technical solutions in embodiments of the invention will be described clearly and completely in the following, with reference to the accompanying drawings in embodiments of the invention. Apparently, the embodiments described are only a part of the embodiments of the invention, not all embodiments. All other embodiments obtained by those skilled in the art based on embodiments of the invention without creative efforts fall within the scope of the invention.

Referring to FIG. 1 to FIG. 5, the invention discloses an underwater cleaning robot. The underwater cleaning robot includes a magnetic speed detection mechanism 1 and a magnetic collision buffer mechanism 3 that are appropriate for the underwater cleaning robot. The magnetic speed detection wheel mechanism 1 is mounted on a main body 2 of the cleaning robot. The magnetic speed detection mechanism 1 comprises two speed detection wheel mechanisms 10 each including a wheel bracket 11, an induction wheel 12 rotationally disposed inside the wheel bracket 11, a magnet 14 embedded on one side of the induction wheel 12, and a magnetic force sensor 15 disposed in the wheel bracket 11 and located on one side of the magnet 14.

A quantity of the magnet 14 is at least one. When there are a plurality of magnets 14, the plurality of magnets 14 are embedded on the one side of the induction wheel 12 at equal intervals in a ring shape. The magnetic force sensor 15 is a Hall effect sensor. A Hall effect switch consists of the magnets 14 and the magnetic force sensor 15. The magnets 14 pass by the magnetic force sensor 15 when the induction wheel 12 rotates. The magnetic force sensor 15 generates a corresponding pulse, calculates interval time between two continuous pulses, and then calculates a rotation speed.

An axle 13 is inserted through the induction wheel 12 and passes the inner part of the wheel bracket 11. The induction wheel 12 may be mounted inside the wheel bracket 11 by means of the axle 13.

The top of the wheel bracket 11 is provided with a through-hole 16 for mounting the magnetic force sensor 15. A positioning rod 18 is disposed on one side of the through-hole 16. The through-hole 16 is used to mount the magnetic force sensor 15. The top of the magnetic force sensor 15 extends inside the main body 2, is fastened with an upper cover of the main body 2.

At least one concave platform 21 is disposed on the main body 2. The wheel bracket 11 is mounted inside the concave platform 21. The top of the concave platform 21 is provided with a connection column 22. One end of the positioning rod 18 extends inside the connection column 22 and is provided with a tight-fit sleeve 19. At least one stop block 17 having one end reaching the top of the concave platform 21 is disposed on the top of the wheel bracket 11. The concave platform 21 has a slot for mounting the speed detection wheel mechanism 10 on the main body 2. The positioning rod 18 is locked inside the connection column 22 through the tight-fit sleeve 19. The stop block 17 passes the concave platform 21 and enters the main body 2 to further ensure stability of the wheel bracket 11.

Due to the speed detection wheel mechanism 10, when the induction wheel 12 rotates, the induction wheel 12 may drive the magnet 14 to pass the magnetic force sensor 15. After the magnetic force sensor 15 calculates the rotating speed of the induction wheel 12, the main body 2 may automatically increase or decrease the water spray driving force according to a moving speed of the induction wheel 12, to maintain a certain moving speed of the main body 2, increase adaptability to the terrain at the bottom of a swimming pool, and control running power. Thus the battery energy can be effectively saved, the battery life can be prolonged, effective cleaning time can be increased, and the needs of users can be met.

Figure 6:
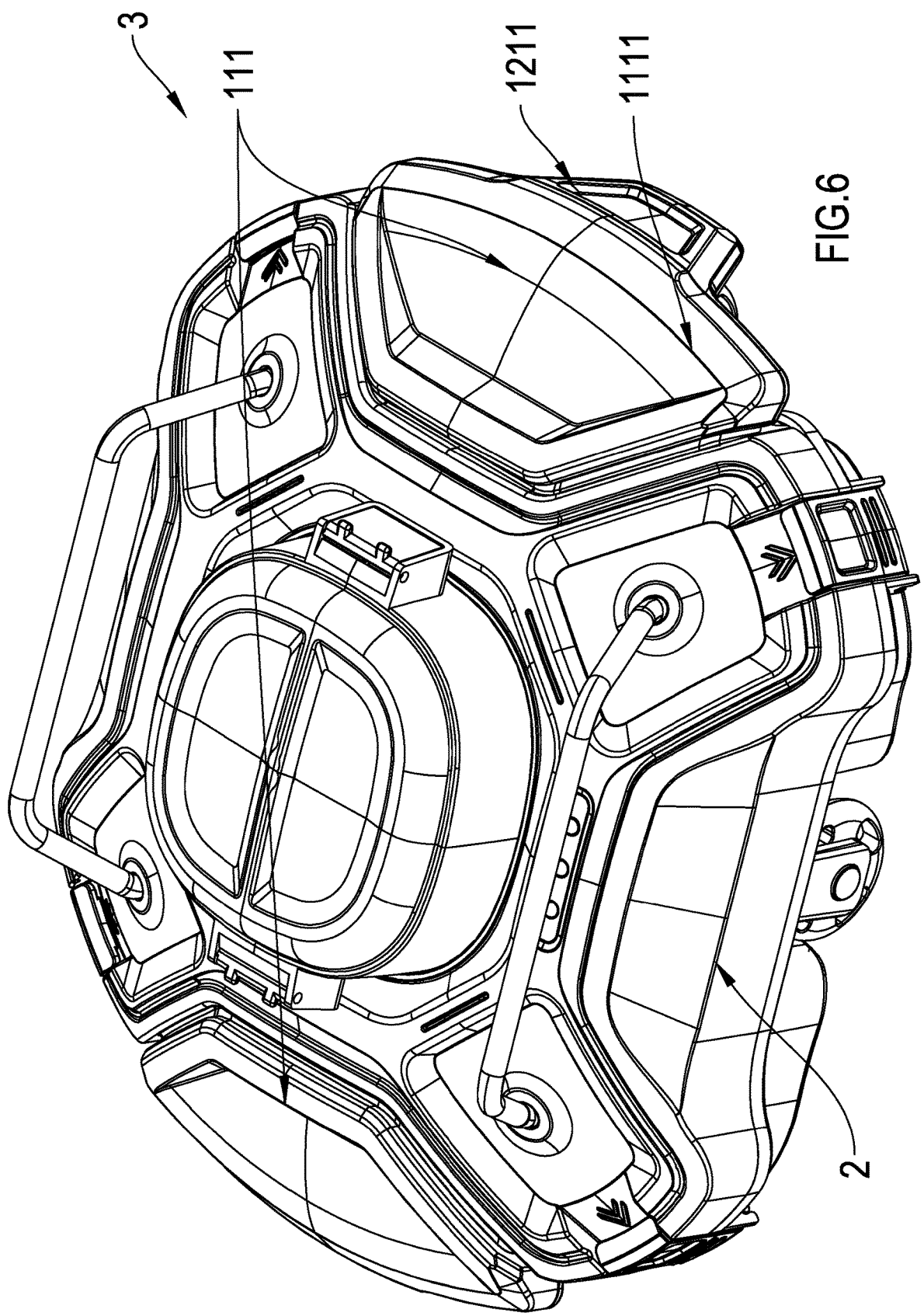
FIG. 6 is another perspective view of the underwater cleaning robot.
Figure 7:
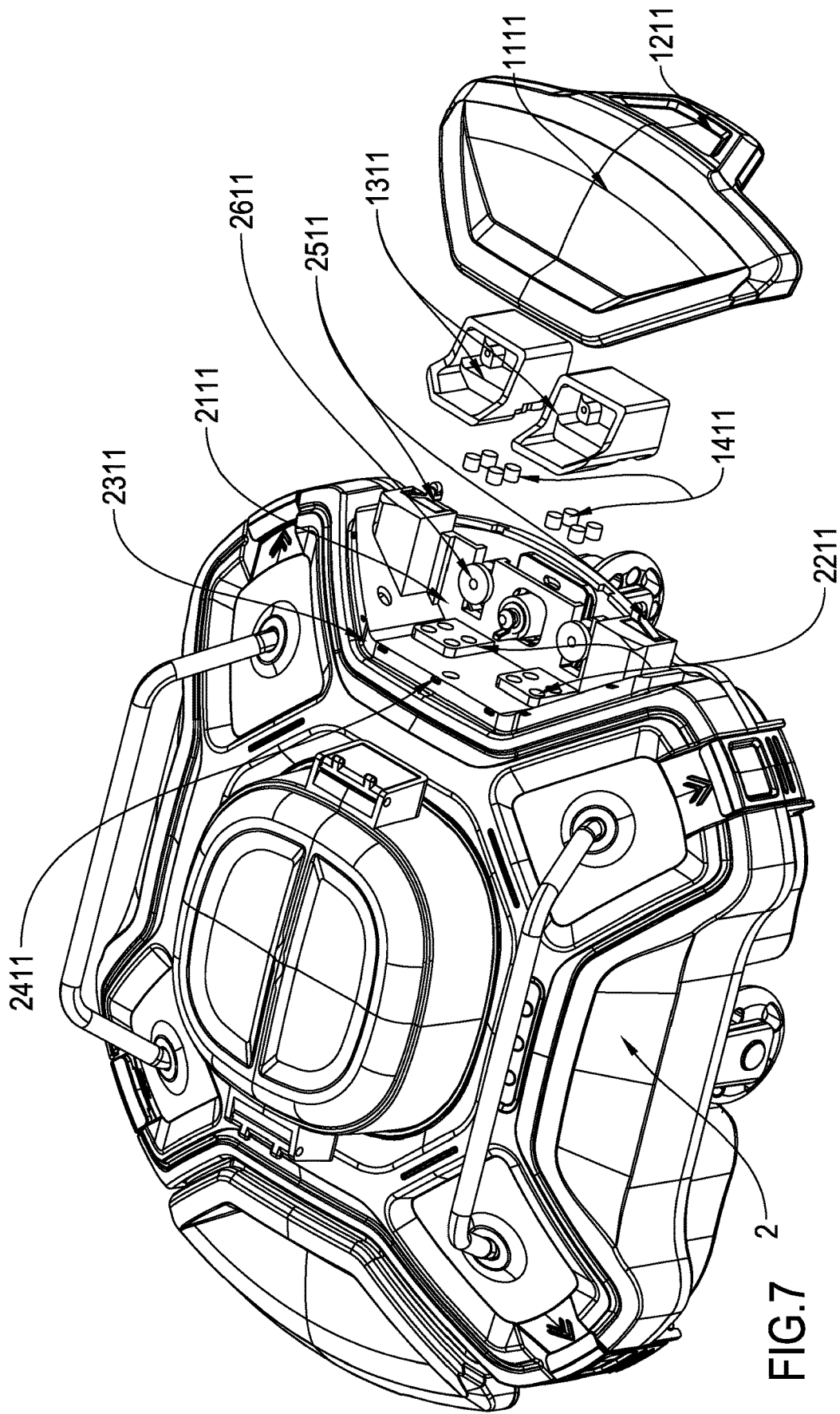
FIG. 7 is another partial exploded view of the underwater cleaning robot showing a collision mechanism being separated.
Figure 8:
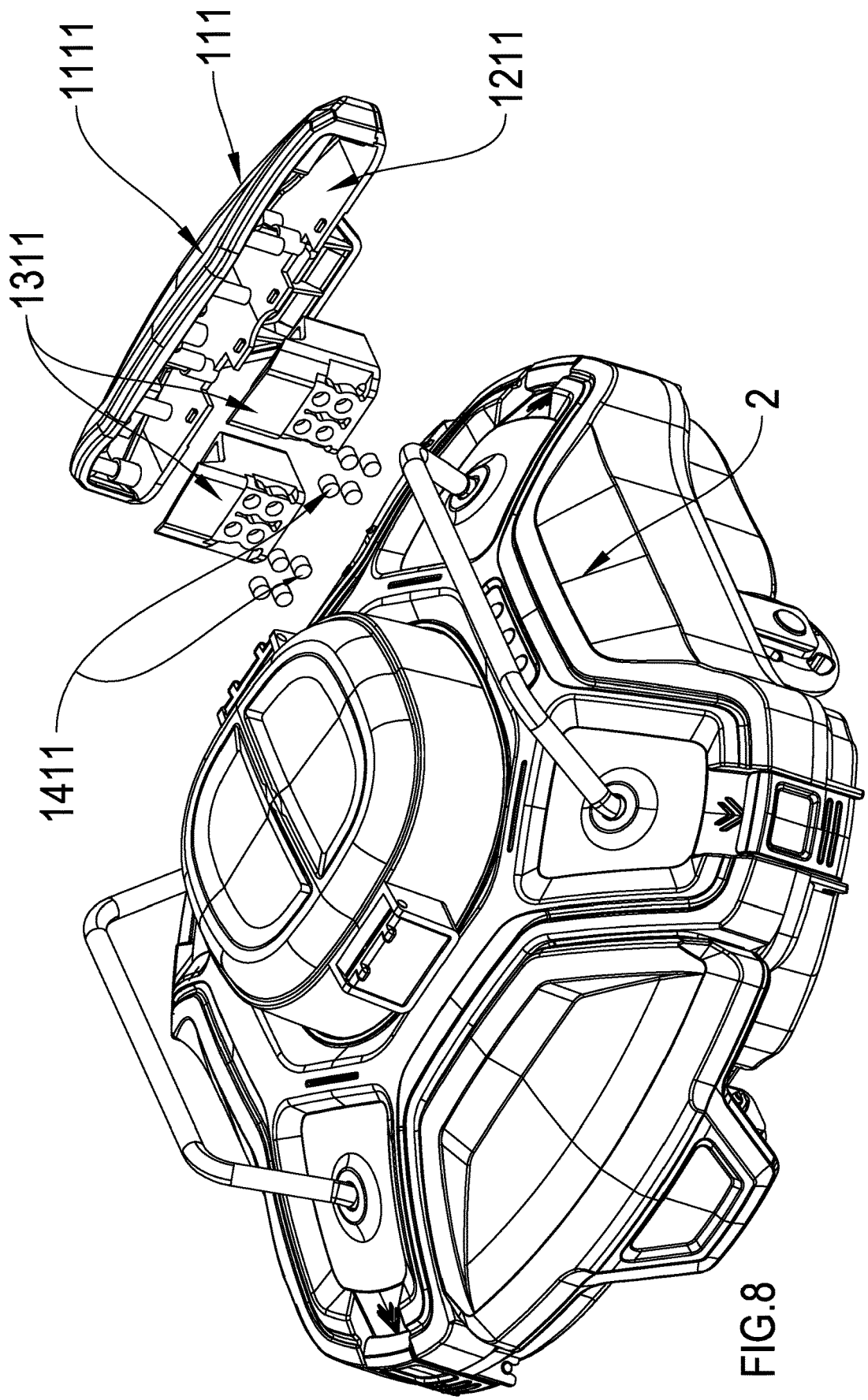
FIG. 8 is yet another partial exploded view of the underwater cleaning robot showing the collision mechanism being separated.

Referring to FIG. 6 to FIG. 8, the magnetic collision buffer mechanism 3 comprises two collision mechanisms 111 mounted on the main body 2. The collision mechanism 111 includes a collision plate 1111, a lower collision lip plate 1211 disposed at the bottom of the collision plate 1111, two fixing blocks 1311 disposed on the lower collision lip plate 1211, and two first magnetic members 1411 embedded at one side of the fixing blocks 1311. Two buffer grooves 2111 are provided in the main body 2. Two second magnetic members 2211 are disposed in the buffer groove 2111 which is used for mounting the collision plate 1111 and the lower collision lip plate 1211. Like poles of the first magnetic members 1411 and the second magnetic members 2211 are opposite each other. Law of magnetic poles states that like poles repel while unlike poles attract. The second magnetic members 2211 and the first magnetic members 1411 are disposed in the main body 2 and the collision mechanism 111 respectively in a spaced manner. Therefore, a non-contact magnetic buffering between the second magnetic members 2211 and the corresponding first magnetic members 1411 is realized. In comparison with the conventional metal springs and the shrapnel, the service life of the invention can be effectively prolonged.

Quantities of the buffer grooves 2111 and the collision mechanisms 111 are at least two. The two collision mechanisms 111 respectively correspond to forward and backward directions of the main body 2. Two limit switches 2511 are disposed in the buffer groove 2111. One end of the limit switch 2511 is attached to an inner wall of the collision plate 1111 to trigger the limit switch 2511 when the collision mechanism 111 is displaced. When the main body 2 moves and touches the wall of the swimming pool, the collision plate 1111 and the lower collision lip plate 1211 are displaced to a certain extent, and the collision plate 1111 triggers the limit switch 2511. After a trigger signal is recognized by the main body 2, the main body 2 starts to move in a reverse direction.

A clamping groove 2311 is disposed at an opening of the buffer groove 2111. One side of the collision plate 1111 is bent and buckled inside the clamping groove 2311. At least one protrusion 2411, having one end abutted against the collision plate 1111, is disposed inside the clamping groove 231111. The projection 2411 is used to limit the resetting distance of the collision plate 1111, so that the collision plate 1111 does not break free from the buffer groove 2111.

Pulleys 2611 are disposed in the buffer groove 2111. The tops of the pulleys 2611 extend to the inner part of the fixing block 1311. The pulley 2611 is fastened with the fixing block 1311. When the collision plate 1111 and the lower collision lip plate 1211 drive the fixing block 1311 to move, the fixing block 1311 slides inside the buffer groove 2111 through sliding blocks, to reduce friction and noises. The overall movement of the collision mechanism 111 is more flexible. Quantities of the fixing blocks 1311 and the pulleys 2611 located in the same buffer groove 2111 are at least two.

Due to the collision mechanism 111, the second magnetic members 2211 and the first magnetic members 1411 can be disposed in corresponding positions of the main body 2 and the collision mechanism 111 respectively, to realize non-contact magnetic buffering. In comparison with the metal springs the and shrapnel, the service life of the invention may be effectively prolonged. In addition, metal corrosion and pollution can be prevented, so that the underwater cleaning robot is more environment-friendly, gets more economic benefit, and has broad application prospects.

While the invention has been described in terms of preferred embodiments, those skilled in the art will recognize that the invention can be practiced with modifications within the spirit and scope of the appended claims.

What is claimed is:

1. An underwater cleaning robot, comprising a main body including a magnetic speed detection mechanism and a magnetic collision buffer mechanism;
   wherein the magnetic speed detection mechanism includes two speed detection wheel mechanisms mounted on the main body; and
   wherein each of the speed detection wheel mechanisms include a wheel bracket, an induction wheel rotationally disposed inside the wheel bracket, a magnet embedded on one side of the induction wheel, and a magnetic force sensor at one side of the magnet being disposed in the wheel bracket.

2. The underwater cleaning robot of claim 1, further comprising an axle inserted through the induction wheel and passing through the wheel bracket.

3. The underwater cleaning robot of claim 1, wherein a top of the wheel bracket is provided with a through-hole for mounting the magnetic force sensor, a positioning rod is disposed on one side of the through-hole, at least one concave platform is disposed on the main body, and the wheel bracket is mounted inside the concave platform.

4. The underwater cleaning robot of claim 3, wherein a top of the concave platform is provided with a connection column, and one end of the positioning rod extends inside the connection column and is provided with a tight-fit sleeve.

5. The underwater cleaning robot of claim 1, further comprising at least one stop block having one end reaching the top of the concave platform, wherein the at least one stop block is disposed on the top of the wheel bracket.

6. The underwater cleaning robot of claim 1, wherein the magnetic collision buffer mechanism comprises a plurality of collision mechanisms mounted on the main body, each of the collision mechanisms comprising a collision plate, a lower collision lip plate disposed at a bottom of the collision plate, a fixing block disposed on the lower collision lip plate, and two first magnetic members embedded at one side of the fixing block; a plurality of buffer grooves each disposed in the main body and used for mounting the collision plate and the lower collision lip plate; and two second magnetic members disposed in the buffer grooves respectively; wherein like poles of the first magnetic members and the second magnetic members are opposite each other.

7. The underwater cleaning robot of claim 6, wherein the collision mechanisms respectively correspond to forward and backward directions of the main body.

8. The underwater cleaning robot of claim 6, further comprising a plurality of limit switches each disposed inside the buffer groove.

9. The underwater cleaning robot of claim 6, further comprising a plurality of clamping grooves each disposed at an opening of the buffer groove; wherein one side of the collision plate is bent and buckled inside the clamping groove, and at least one protrusion having one end abutted against the collision plate is disposed inside the clamping groove.

10. The underwater cleaning robot of claim 6, further comprising a plurality of pulleys disposed in each of the buffer grooves; wherein tops of the pulleys extend to the inner part of the fixing block, and the numbers of the fixing blocks and the pulleys located in the same buffer groove are at least two.

* * * * *